UNITED STATES PATENT OFFICE.

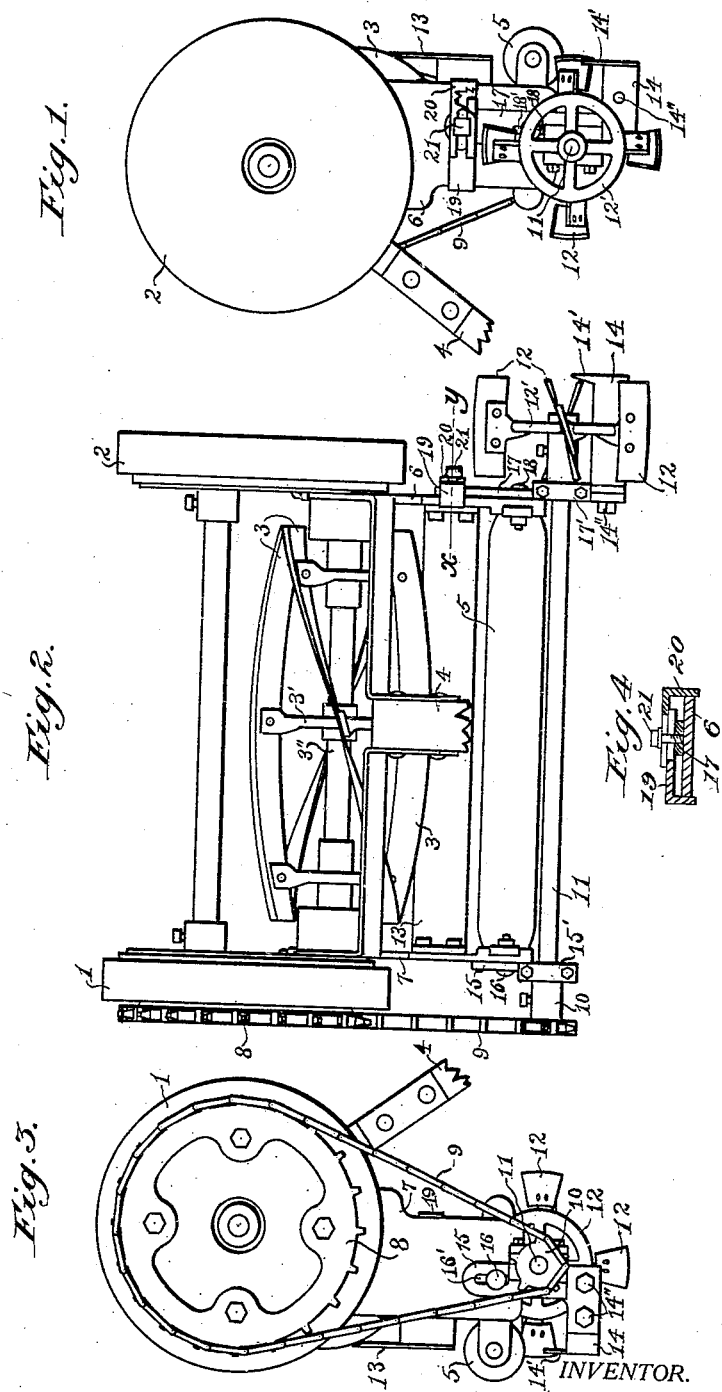

HENRY SMITH, OF BELLINGHAM, WASHINGTON, ASSIGNOR OF ONE-HALF TO JOHN A. BARGER, OF BELLINGHAM, WASHINGTON.

LAWN-MOWER TRIMMING ATTACHMENT.

939,926.  Specification of Letters Patent.  Patented Nov. 9, 1909.

Application filed September 23, 1908. Serial No. 454,436.

*To all whom it may concern:*

Be it known that I, HENRY SMITH, a citizen of the United States, and a resident of Bellingham, in the county of Whatcom and State of Washington, have invented certain new and useful Improvements in Lawn-Mower Trimming Attachments, of which the following is a specification.

My invention relates to an improvement in lawn mowers and consists in a separate cutter extending beyond one of the driving wheels of the machine, means for attaching the same to the machine and means for driving said cutter.

The object of my invention is to provide a readily attachable and detachable device for a lawn mower which is so located that it can be used to trim the borders not accessible to the cutter of the ordinary lawn mower.

My device is illustrated in the accompanying sheet of drawings in which similar characters refer to similar parts throughout.

Figure 1 is an elevation of the right-hand end of the machine, Fig. 2 is a plan view, Fig. 3 is an elevation of the left-hand end of the machine, and Fig. 4 is a sectional view of a part of one of the mower side castings and my attachment where cut by a medial, longitudinal, vertical plane through line $x\ y$ of Fig. 2.

More specifically, 1 and 2 are the driving wheels of the lawn mower, 3, 3 are the knives, 3' the cutter head, 3'' the cutter-head shaft, 4 the handle, 5 the roller, 6 and 7 the side castings and 13 the shear plate. These are parts of a lawn mower as ordinarily built. The new parts representing my invention are as follows:

8 is a sprocket wheel attached to the driving wheel 1.

10 is a sprocket wheel fastened to one end of shaft 11.

9 is a chain meshing with sprocket wheels 8 and 10.

15 is a fixture attachable to side casting 7 by bolt 16 through slot 16', and furnishes the bearing 15' for shaft 11.

17 is a fixture attachable to side casting 6 by bolt 18 through slot 18', and furnishes the bearing 17' for shaft 11.

12, 12 are the knives of the trimming cutter, secured to trimming cutter head 12'. Trimming cutter head 12' is fastened to the right-hand end of shaft 11. A steady clamp is composed of the two parts 19 and 20, each of which is bent over at one end and contains a slot in the other end. These are placed with slotted ends overlapping and bent-over ends lying above and below side casting 6 in which position they are clamped to fixture 17 by screw 21. Shear plate 14 which coöperates with the trimming cutterhead is provided with a right angle bend at one end which is secured to fixture 17 by screws 14''. This shear plate is also provided with finger 14' projecting forward from the extreme right-hand end of the same. Shaft 11 is mounted in its bearings parallel with shaft 3'', sprocket wheels 8 and 10 are in the same plane. Trimming cutter 12, 12' extends beyond drive wheel 2. Finger 14' extends beyond the outer end of trimming knives 12, 12.

It may be observed that this device can be detached from the lawn mower by the removal of bolts 16 and 18, which are bolts used in the machine as ordinarily built, and of clamp 19, 20 and tension on chain 9 can be adjusted by the use of slots 16' and 18'.

Having thus described my invention, I claim:

1. In a lawn mower, drive wheels and a main cutter-shaft and a cutter carried thereby, in combination with a second shaft, a trimming cutter on one end of said second shaft, a shear plate attached to one of the sides of the lawn mower coöperating with said trimming cutter, a removable attachment fastened to each side of said lawn mower, said attachments furnishing bearings for said second shaft and so located that said second shaft may be parallel with the main cutter shaft of said mower, a sprocket wheel on the other end of said second shaft, a sprocket wheel on one of said drive wheels and a chain over said sprocket wheels.

2. In a device of the character described, the combination of the frame of a lawn mower, a shaft on which is mounted a cutter head and a driving gear, a plurality of fixtures each suited to furnish a bearing for said shaft and each having a slotted hole through which is a screw or bolt attached to the frame of the lawn mower, and a clip of adjustable length suited to span the width of one of the side castings of said mower and being adapted for attachment to one of said fixtures.

Signed at Bellingham, in the county of Whatcom and State of Washington, this 17th day of September, A. D. 1908.

HENRY SMITH.

Witnesses:
R. S. SIMPSON,
DAVID E. LAIN.